J. M. CALLER.
Rotary-Cutters for Leather-Dressing-Machines.
No. 150,285. Patented April 28, 1874.
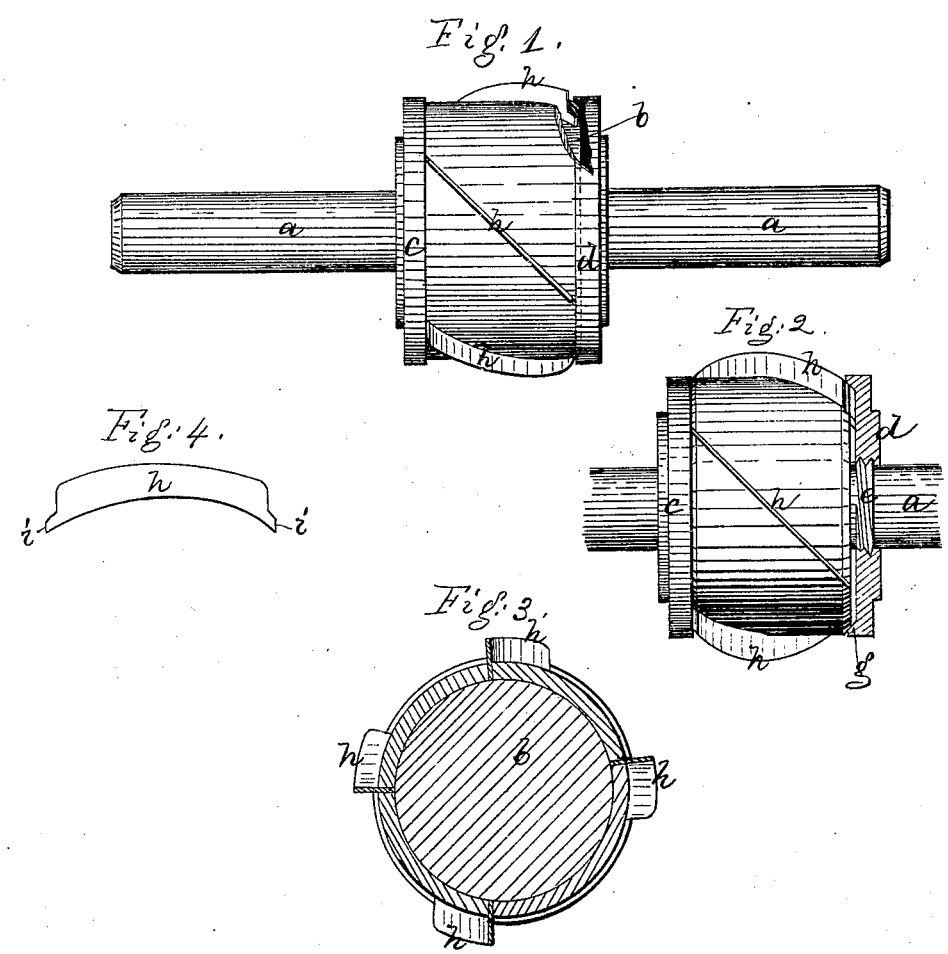

UNITED STATES PATENT OFFICE.

JAMES M. CALLER, OF SALEM, MASSACHUSETTS, ASSIGNOR TO JAMES M. CALLER, TRUSTEE, OF SAME PLACE.

IMPROVEMENT IN ROTARY CUTTERS FOR LEATHER-DRESSING MACHINES.

Specification forming part of Letters Patent No. 150,285, dated April 28, 1874; application filed April 7, 1874.

*To all whom it may concern:*

Be it known that I, JAMES M. CALLER, of Salem, in the county of Essex and State of Massachusetts, have invented an Improved Rotary Tool for Leather-Dressing Machines; and I do hereby declare that the following, taken in connection with the drawings which accompany and form part of this specification, is a description of my invention sufficient to enable those skilled in the art to practice it.

The invention relates to the construction of a working tool or cylinder to be used in leather-dressing machines, and particularly to the specific construction of a tool having the general form of that shown in United States Letters Patent No. 138,874, in which a series of spiral blades are arranged near together and equidistant or parallel, as seen in said patent, to form the working edges. Where such blades are made as integral parts of the cylinder, or are not separably movable, it is very difficult, if not impossible, to repair the tool in case of breakage of either blade; and in my invention, and to remedy this difficulty, I make the tool with a fixed cylinder, having arranged around its peripheral surface a series of holders, with ends parallel to the cylinder-ends, and with spiral-shaped sides or edges, the cutter-blade fitting between and being held by the edges of adjacent plates, and the holders and blades being confined to the cylinder by cylinder-heads, each of which is fixed and made with a flange, or as a flanged screw-cap, screwing up to the adjacent end of the cylinder. By these flanges the opposite end of the head, the blades, and holders are confined, each blade having two projections extending under the opposite flanges, and the opposite ends of each holder passing directly under said flanges. My invention consists in the working tool having removable blades thus confined, any blade being liberated by starting back the screw-cap.

The drawing represents a tool embodying my construction.

Figure 1 shows the tool in elevation, a part being broken away to show the extension of the block under the retaining-flange. Fig. 2 shows the tool in side elevation, with a section of one of the screw-caps. Fig. 3 is a cross-section of the tool. Fig. 4 shows one of the spiral blades.

$a$ denotes the shaft; $b$, the cylinder or head, fixed to or forming part of the shaft. $c\ d$ denote two caps at opposite ends of the cylinder or head $b$. One of said caps may be fixed to or form part of the cylinder; but I prefer to make each movable, forming it with a nut-thread working on a screw-thread, $e$, to screw it up to or away from the cylinder. Each cap is made with an inwardly-projecting flange, $g$, which, when the cap is in place, forms an annular groove at each end of the cylinder. Upon the cylinder are placed a series of concave holder-plates, fitting to the curved surface of the cylinder, and having parallel ends extending under the flanges $g$ and spiral parallel edges, these plates being such in number as to receive between their respective adjacent edges the several working blades $h$, the inner edges of each of which fit to the cylinder and are confined between the holder-plates, while their outer working edges extend from the cylinder, as seen in the drawing. Each blade has at its opposite ends projections $i$, which extend into the annular grooves formed by the flanges $g$.

When the holders and blades $h$ are in place, the screw-caps bind them all together and hold them securely, and by loosening either cap any blade may be dislodged for repairs or replacement by another; or all of the holders and blades may be removed to be replaced by others set at different angles, or nearer together, or farther apart.

The drawing represents but four blades; but in practice the blades are to be arranged closely together, substantially as seen in said Patent No. 138,874.

I claim—

The working tool having the movable blades held by and between the sectional holders and the flanges $g$, said flanges also retaining the holders, all substantially as shown and described.

JAS. M. CALLER.

Witnesses:
FRANCIS GOULD,
M. W. FROTHINGHAM.